(12) United States Patent
Heeter et al.

(10) Patent No.: US 11,078,839 B2
(45) Date of Patent: Aug. 3, 2021

(54) COMPOSITE NOSECONE

(71) Applicant: Rolls-Royce Corporation, Indianapolis, IN (US)

(72) Inventors: Robert Heeter, Noblesville, IN (US); Matthew J. Kappes, Greenwood, IN (US); Benedict N. Hodgson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 618 days.

(21) Appl. No.: 15/876,574

(22) Filed: Jan. 22, 2018

(65) Prior Publication Data
US 2019/0226401 A1    Jul. 25, 2019

(51) Int. Cl.
*F01D 25/00* (2006.01)
*F02C 7/04* (2006.01)
(Continued)

(52) U.S. Cl.
CPC ............ *F02C 7/04* (2013.01); *B29C 70/08* (2013.01); *C08J 5/042* (2013.01); *C08J 5/043* (2013.01);
(Continued)

(58) Field of Classification Search
CPC ...... F02C 7/04; F02C 7/00; F02C 7/05; B29C 70/04; B29C 70/06; B29C 70/08; C08J 5/042; C08J 5/043; C08J 5/045
See application file for complete search history.

(56) References Cited

U.S. PATENT DOCUMENTS 4,624,820 A * 11/1986 Barraclough ........... B29C 70/44
                                                    264/102
4,699,568 A * 10/1987 Harlamert .............. B64D 15/12
                                                    416/155
(Continued)

FOREIGN PATENT DOCUMENTS

DE     102010005897 A1    2/2011
WO       2015142395 A2    9/2015

OTHER PUBLICATIONS

"Fiber," https://www.thefreedictionary.com/fiber, retrieved on Mar. 31, 2020, 6 pp.
(Continued)

*Primary Examiner* — Michael H Wang
(74) *Attorney, Agent, or Firm* — Shumaker & Sieffert, P.A.

(57) ABSTRACT

The disclosure describes composite nosecones and techniques for forming composite nosecones including a matrix material, relatively higher-modulus reinforcement elements, and relatively tougher polymer-based reinforcement elements. An example composite nosecone includes a body substantially symmetrical around a central axis. The body includes a side wall defining a diameter of the body that increases from a forward side of the body to an aft side of the body. The body includes a composite material including a plurality of relatively higher-modulus reinforcement elements, a plurality of relatively tougher polymer-based reinforcement elements, and a matrix material substantially encapsulating the plurality of relatively higher-modulus reinforcement elements and the plurality of relatively tougher polymer-based reinforcement elements. The plurality of relatively higher-modulus reinforcement elements are different from the plurality of relatively tougher polymer-based reinforcement elements.

20 Claims, 8 Drawing Sheets

(51) Int. Cl.
  *C08L 77/10* (2006.01)
  *C08J 5/04* (2006.01)
  *F02C 7/05* (2006.01)
  *B29C 70/08* (2006.01)
  *F01D 5/28* (2006.01)

(52) U.S. Cl.
  CPC .............. *C08L 77/10* (2013.01); *F01D 5/282* (2013.01); *F02C 7/05* (2013.01); *B32B 2377/00* (2013.01); *C08J 2300/24* (2013.01); *C08L 2201/08* (2013.01); *F05D 2220/32* (2013.01); *F05D 2220/36* (2013.01); *F05D 2300/431* (2013.01); *F05D 2300/433* (2013.01)

(56) References Cited

U.S. PATENT DOCUMENTS

| | | | | |
|---|---|---|---|---|
| 4,957,415 | A | * | 9/1990 | Paul ........................ B29C 70/04 264/122 |
| 5,149,251 | A | * | 9/1992 | Scanlon ................... B64C 11/14 416/224 |
| 5,182,906 | A | | 2/1993 | Gilchrist et al. |
| 5,217,283 | A | | 6/1993 | Watanabe |
| 5,252,160 | A | * | 10/1993 | Scanlon ................... B29C 33/02 156/196 |
| 5,833,435 | A | * | 11/1998 | Smith ....................... F02C 7/04 416/94 |
| 6,358,014 | B1 | * | 3/2002 | Chou ....................... B64C 11/14 29/889.1 |
| 6,416,280 | B1 | | 7/2002 | Forrester et al. |
| 6,447,255 | B1 | * | 9/2002 | Bagnall ................... F01D 5/066 277/626 |
| 6,561,763 | B2 | | 5/2003 | Breakwell |
| 6,942,462 | B2 | | 9/2005 | Breakwell et al. |
| 7,419,556 | B2 | * | 9/2008 | Holland ................... B29C 73/10 156/228 |
| 8,092,183 | B2 | | 1/2012 | Borzakian et al. |
| 8,251,670 | B2 | * | 8/2012 | Anghileri ................ F02C 7/055 416/245 R |
| 8,292,586 | B2 | | 10/2012 | Bottome |
| 8,425,197 | B2 | | 4/2013 | Breakwell |
| 8,529,204 | B2 | | 9/2013 | Bagnall |
| 8,596,981 | B2 | | 12/2013 | Hoyland et al. |
| 8,616,849 | B2 | | 12/2013 | Menheere et al. |
| 8,677,622 | B2 | * | 3/2014 | Schreiber .............. F04D 29/541 29/889.2 |
| 8,753,094 | B2 | * | 6/2014 | Bottome .................. H01M 2/30 416/245 R |
| 8,827,651 | B2 | | 9/2014 | Bottome |
| 8,911,656 | B2 | * | 12/2014 | Doddman ............. B29C 33/505 264/314 |
| 9,017,031 | B2 | | 4/2015 | Bottome |
| 9,200,595 | B2 | | 12/2015 | Bottome |
| 9,228,444 | B2 | | 1/2016 | Evans et al. |
| 9,249,776 | B2 | * | 2/2016 | Baehmann ................ F03D 1/04 |
| 9,410,431 | B2 | | 8/2016 | Bottome et al. |
| 9,481,448 | B2 | * | 11/2016 | Totten ..................... B64C 11/14 |
| 9,682,450 | B2 | | 6/2017 | Tomeo et al. |
| 9,739,162 | B2 | | 8/2017 | Bottome et al. |
| 9,752,449 | B2 | | 9/2017 | Bottome et al. |
| 10,207,792 | B2 | * | 2/2019 | Holland ................ F04D 29/329 |
| 10,364,700 | B2 | * | 7/2019 | Olver ...................... F01D 25/18 |
| 10,392,949 | B2 | * | 8/2019 | Roach ....................... F01D 5/12 |
| 2001/0031594 | A1 | | 10/2001 | Perez et al. |
| 2012/0244003 | A1 | | 9/2012 | Mason |
| 2012/0263596 | A1 | | 10/2012 | Evans et al. |
| 2014/0086751 | A1 | | 3/2014 | Bottome et al. |
| 2014/0186166 | A1 | * | 7/2014 | Kostka .................... F01D 5/146 415/182.1 |
| 2014/0255202 | A1 | | 9/2014 | Kling et al. |
| 2015/0132134 | A1 | | 5/2015 | Murdock |
| 2015/0198174 | A1 | | 7/2015 | Houle |
| 2015/0300194 | A1 | | 10/2015 | Bottome et al. |
| 2016/0010459 | A1 | * | 1/2016 | Romanowski ............ F02C 7/04 416/245 R |

OTHER PUBLICATIONS

Corporate Technologies, Innegra Technologies, 2014 (Applicant points out, in accordance with MPEP 609.04(a), that the year of publication, 2014, is sufficiently earlier than the effective U.S. filing date, 2017, so that the particular month of publication is not in issue.) 24 pp.
Final Report Summary—ORCA (Development of an Optimized Large Scale Engine CFRP annulus filler), retrieved from hllps://cordis.europa.eu/resull/rcn/147995_en.html, Jul. 13, 2018, 3 pp.
Olefin-Carbon Fiber Hybrid Wins JEC Innovation Award, plasticstoday.com, Oct. 3, 2013, 2 pp.
Black, "Automotive Composites: Thermosets for the Fast Zone," compositesworld.com, Aug. 31, 2015, 6 pp.
Gardiner, "HP-RTM on the Rise," compositesworld.com, Apr. 14, 2015, 6 pp.
Horejsi et al., "FACC AG & CleanSky," CleanSky, Jan. 2011, 18 pp.
Meister et al., "Switzerland: The Engine of the Future," maschinenmarkt, Jan. 20, 2016, 2 pp.
Sloan et al., "GE Aviation, Batesville, MS, US," compositesworld.com, Feb. 8, 2016, 5 pp.
U.S. Appl. No. 16/037,980, filed Jul. 17, 2018, by Heeter et al.
Response to Extended Search Report dated Jun. 19, 2019, from counterpart European Application No. 18213953.5, filed Dec. 18, 2019, 67 pp.
Extended Search Report from counterpart European Application No. 18213953.5, dated Jun. 19, 2019, 7 pp.
Response to Communication pursuant to Article 94(3) EPC from counterpart EP Application No. 18213953.5 dated Apr. 21, 2020, filed Jul. 30, 2020, 69 pgs.
Communication pursuant to Article 94(3) EPC from counterpart EP Application No. 18213953.5 dated Apr. 21, 2020, 3 pgs.
Communication under Rule 71(3) EPC from counterpart EP Application No. 18213953.5 dated Nov. 10, 2020, 88 pgs.

* cited by examiner

COMPOSITE NOSECONE

TECHNICAL FIELD

The present disclosure relates to composite nosecones for gas turbine engines.

BACKGROUND

Gas turbine engines used to propel vehicles, e.g., aircraft, often include a fan assembly that is driven by an engine core. The fan assembly blows air to provide thrust for moving the aircraft. Fan assemblies typically include a bladed wheel mounted to the engine core and a nosecone or spinner mounted to the bladed wheel to rotate with the bladed wheel. The fan rotor may also be a bladed disk (e.g., a blisk). The nosecone directs air radially-outward from the center of the bladed wheel and into the blades of the fan assembly so that the blades can accelerate the air. Some nosecones include components made from composite materials.

SUMMARY

The disclosure describes composite nosecones and techniques for forming composite nosecones. A composite nosecone as described herein is formed from a composite material, which includes a matrix material, relatively higher-modulus reinforcement elements and relatively tougher polymer-based reinforcement elements. Such composite nosecones may be relatively lightweight, yet strong to resist forces acting upon the composite nosecone and tough (e.g., reduced brittleness) to increase resistance to fracturing when struck by a foreign object.

In some examples, the disclosure describes a composite nosecone including a body substantially symmetrical around a central axis. The body includes a side wall defining a diameter of the body that increases from a forward side of the body to an aft side of the body. The body includes a composite material including a plurality of relatively higher-modulus reinforcement elements, a plurality of relatively tougher polymer-based reinforcement elements, and a matrix material substantially encapsulating the plurality of relatively higher-modulus reinforcement elements and the plurality of relatively tougher polymer-based reinforcement elements. The plurality of relatively higher-modulus reinforcement elements are different from the plurality of relatively tougher polymer-based reinforcement elements.

In some examples, the disclosure describes a method of constructing a composite nosecone. The method includes defining a nosecone shape with a matrix material, a plurality of relatively higher-modulus reinforcement elements, and a plurality of relatively tougher polymer-based reinforcement elements. The plurality of relatively higher-modulus reinforcement elements are different from the plurality of relatively tougher polymer-based reinforcement elements. The composite nosecone includes a body substantially symmetrical around a central axis, and a side wall defining a diameter of the body that increases from a forward side of the body to an aft side of the body. The method also includes curing a matrix material substantially encapsulating the plurality of relatively higher-modulus reinforcement elements and the plurality of relatively tougher polymer-based reinforcement elements to form the composite nosecone.

The details of one or more examples are set forth in the accompanying drawings and the description below. Other features, objects, and advantages will be apparent from the description and drawings, and from the claims.

DETAILED DESCRIPTION

Figure 1:
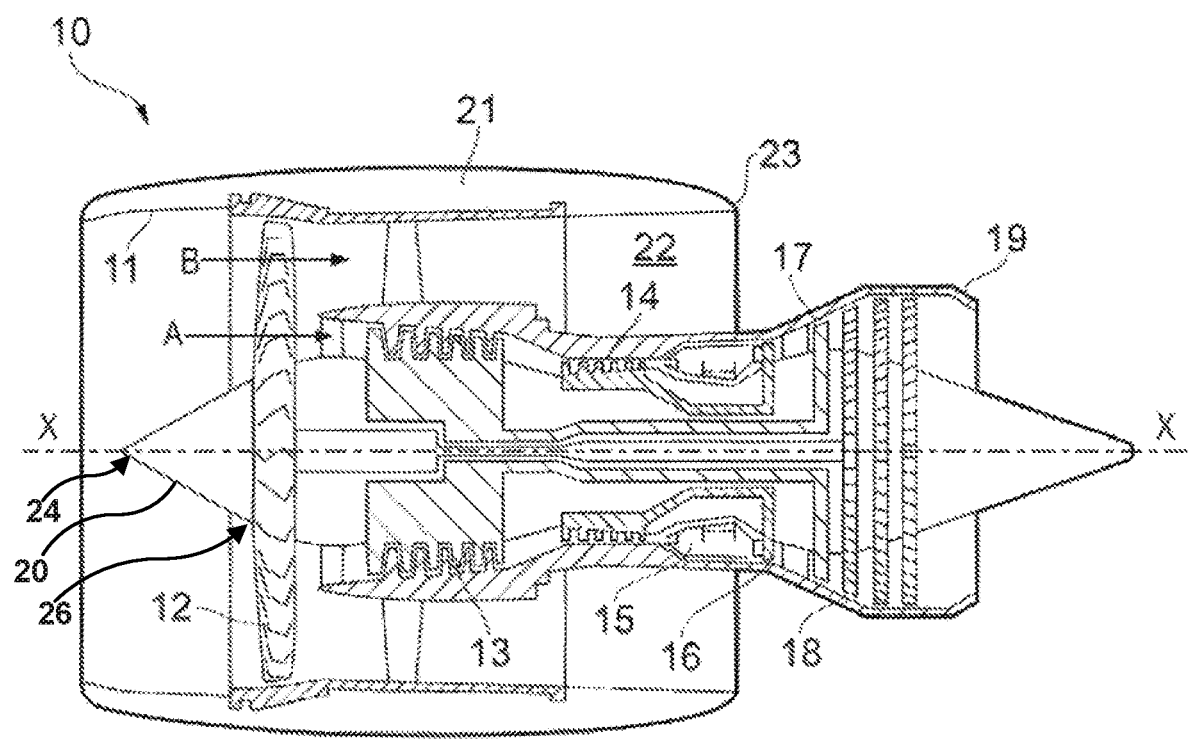
FIG. 1 is a schematic diagram illustrating a longitudinal cross-section view of an example high-bypass gas turbine engine.

The disclosure describes composite nosecones and techniques for forming composite nosecones. Composite nosecones or composite nosecones in combination with support rings may also be referred to as gas turbine engine spinners. Manufacturing of composite nosecones can present challenges in providing desired characteristics such as, for example, light weight, high stiffness, and impact resistance. A composite nosecone as described herein is formed from a composite material, which includes a matrix material, relatively higher-modulus reinforcement elements and relatively tougher polymer-based reinforcement elements. The relatively higher-modulus reinforcement elements have a higher tensile modulus compared to the relatively tougher polymer-based reinforcement elements. The relatively tougher polymer-based reinforcement elements have a reduced brittleness compared to the relatively higher-modulus reinforcement elements. For example, as used herein, a relatively higher-modulus reinforcement element has a tensile modulus (e.g., Young's modulus or elastic modulus) of at least about 60 GPa, and a relatively tougher polymer-based reinforcement element has a strain elongation at break of greater than about 6.0%. Example relatively higher-modulus reinforcement elements include, but are not limited to, aramid fibers, carbon fibers, glass fibers, or the like. Example relatively tougher polymer-based modulus reinforcement elements include, but are not limited to, polypropylene fibers, polyester fibers, high performance polyethylene fibers, or the like. Such composite nosecones may be relatively lightweight, yet strong to resist forces acting upon the composite nosecone. By including relatively tougher polymer-based reinforcement elements in addition to relatively higher-modulus reinforcement elements, the composite nosecone may exhibit increased toughness (e.g., reduced brittleness), which may increase resistance to fracturing when struck by a foreign object, such as birds, hailstones, or the like.

A composite nosecone includes a body formed substantially symmetrical around a central longitudinal axis. The body includes a side wall defining a diameter of the composite nosecone that increases from a forward side of the body to an aft side of the body, e.g., along the central axis. For example, the body defines a conical shape (e.g., a half-cone) or conical frustum shape. In addition to defining the conical or conical frustum shape, the sidewall may taper from a minimum thickness (measured in a radial direction of the conical or conical frustum shape) near the apex of the cone (or the upper base of the conical frustum) to a maximum near the base of the cone (or the lower base of the conical frustum).

The composite nosecone is configured to be mounted on a bladed wheel or blisk of a fan assembly of a gas turbine engine stage. For example, one or more attachment areas may be integrally formed with the body to mount the composite nosecone to the bladed wheel. Alternatively, the composite nosecone may be configured to be received in a fairing that is configured to affix to the bladed wheel. The composite nosecone includes one or more layers, such as, inner layers and an outer layer. The outer layer includes a radially outer surface of the body that directs air radially outward from the center of the bladed wheel and toward blades of the bladed wheel. The outer surface of the composite nosecone may be at risk of being struck by foreign objects during operation of the gas turbine engine. These strikes may compromise the mechanical integrity of the body of the composite nosecone.

In some examples, a composite nosecone may include regions, such as the aft side of the body near the attachment areas or outer surface of the body near an important impact area (e.g., an important impact location may include an area of a nosecone that is more prone to failure when impacted by a foreign object compared to other areas of the nosecone), that may include a higher ratio of relatively tougher polymer-based reinforcement elements compared to other regions of the composite nosecone. The ratio of relatively tougher polymer-based reinforcement elements to relatively higher-modulus reinforcement elements for a given region may range from zero (no relatively tougher polymer-based reinforcement elements and only relatively higher-modulus reinforcement elements) to infinite (only relatively tougher polymer-based reinforcement elements and no relatively higher-modulus reinforcement elements). A higher ratio of relatively tougher polymer-based reinforcement elements may result in added toughness compared to regions with a lower ratio of relatively tougher polymer-based reinforcement elements. On the other hand, in some examples, other regions, such as the forward side of the body or outer layers of the body away from critical impact areas, may include a lower ratio of relatively tougher polymer-based reinforcement elements (i.e., a higher ratio of relatively higher-modulus reinforcement elements), which may result in greater strength but also increased brittleness. As the regions that include a lower ratio of relatively tougher polymer-based reinforcement elements may be less likely to be impacted by a foreign object or may have reduced deflection after impact, the brittleness may not be a primary design concern for these regions. Instead, the stiffness (a relatively high modulus of elasticity) may be a primary design concern for these regions.

In some examples, the reinforcement elements included in the composite materials are arranged into two-dimensional or three-dimensional reinforcement architectures. The relatively tougher polymer-based reinforcement elements may be separate from, intermingled with, braided with, interwoven with, or wound along with the relatively higher-modulus reinforcement elements, depending on the particular properties selected for a particular region of the composite nosecone. For example, an individual braid, weave, or winding may include a plurality of strands. Each respective strand of the plurality of strands includes one or more tows (e.g., yarns). Each tow includes a plurality of fibers. A pure braid, pure weave, or pure winding includes only strands having one or more tows that include only fibers of the same material. A hybrid braid, hybrid weave, or hybrid winding include at least one first strand having one or more tows that include fibers of a first material and a second strand having one or more tows that include fibers of a second, different material. A hybrid braid, hybrid weave, or hybrid winding may include more than two types of strands, each strand intermingled by having one or more tows including a different type of fiber. A commingled braid, commingled weave, or commingled winding includes at least one strand having at least one first tow that includes fibers of a first material and at least one second tow that includes fibers of a second, different material. Further, different regions of the composite nosecone may include different combinations of only relatively tougher polymer-based reinforcement elements, only relatively higher-modulus reinforcement elements, or mixtures, filament windings, weaves, braids, or the like of relatively tougher polymer-based reinforcement elements, relatively higher-modulus reinforcement elements, or both.

FIG. 1 is a schematic diagram illustrating a longitudinal cross-section view of an example high-bypass gas turbine engine 10. The central axis (e.g., principal and rotational axis) of rotating elements of gas turbine engine 10 is the X-X axis. Gas turbine engine 10 includes an air intake 11, a fan 12, and a core flow system A. The fan 12 includes rotor blades which are attached to a rotor disc. Composite nosecone 20 may be mounted to fan 12. The core flow system A includes an intermediate-pressure compressor 13, a high-pressure compressor 14, a combustion chamber 15, a high-pressure turbine 16, an intermediate-pressure turbine 17, a low-pressure turbine 18, and a nozzle 19. Furthermore, outside the core flow system A, the gas turbine engine includes bypass flow system B. The bypass flow system B includes a nacelle 21, a fan bypass 22, and a fan nozzle 23. In other examples, high-bypass gas turbine engine 10 may include few components or additional components.

Thrust, which propels an aircraft, is generated in a high-bypass gas turbine engine 10 by both the fan 12 and the core flow system A. Air enters the air intake 11 and flows substantially parallel to central axis X-X past the rotating fan 12, which increases the air velocity to provide a portion of the thrust. A first portion of the air that passes between the rotor blades of the fan 12 enters the core flow system A, while a second portion enters the bypass flow system B. Air that enters the core flow system A is first compressed by intermediate-pressure compressor 13, then high-pressure compressor 14. The air in core flow system A enters combustion chamber 15, where it is mixed with fuel and ignited. The air that leaves the combustion chamber 15 has an elevated temperature and pressure compared to the air that first entered the core flow system A. The air with elevated temperature and pressure produces work to rotate, in succession, high-pressure turbine 16, intermediate-pressure turbine 17, and low-pressure turbine 18, before ultimately leaving the core flow system A through nozzle 19. The rotation of turbines 16, 17, and 18 rotates high-pressure compressor 14, intermediate pressure compressor 13, and fan 12, respectively. Air that passes through bypass flow system B does not undergo compression or combustion and does not produce work to rotate turbines 16, 17, and 18, but contributes propulsive thrust to gas turbine engine 10.

During operation, blades of fan 12 rotate around central axis X-X, driven by low-pressure turbine 18. Composite nosecone 20 is mounted to fan 12. Composite nosecone 20 includes a body substantially symmetrical around central axis X-X. The body of composite nosecone 20 includes a side wall defining a diameter of the body. The sidewall is tapered such that the thickness of the sidewall increases along central axis X-X from a forward side 24 of the body to an aft side 26 of the body. Composite nosecone 20 includes at least one attachment area integrally formed with the body. The at least one attachment area is shaped and positioned to attach composite nosecone 20 to fan 12.

In accordance with the disclosure, the body of composite nosecone 20 is formed of a composite material, which includes a matrix material, relatively tougher polymer-based reinforcement elements, and relatively higher-modulus reinforcement elements. The plurality of relatively higher-modulus reinforcement elements is different from the plurality of relatively tougher polymer-based reinforcement elements. The relatively higher-modulus reinforcement elements have a higher tensile modulus than the relatively tougher polymer-based reinforcement elements. In this way, the relatively higher-modulus reinforcement elements contribute to the strength of composite nosecone 20. The relatively tougher polymer-based reinforcement elements have a higher strain elongation at break than the relatively higher-modulus reinforcement elements. In this way, the relatively tougher polymer-based reinforcement elements contribute to the toughness of composite nosecone 20.

The matrix material may include a polymer configured to substantially surround the relatively higher-modulus reinforcement elements and relatively tougher polymer-based reinforcement elements. The matrix material includes a polymer. For example, the matrix material may include a thermoset polymer, including but not limited to, an epoxy. In some examples, the matrix material may be a polymer that cures at a relatively low temperature, such as less than about 150° C. For example, the matrix material may include CYCOM® 823 RTM (cures at a temperature of about 125° C. in about 1 hour), available from Cytec Solvay Group, Brussels, Belgium; HexPly® M77 (cures at a temperature of about 150° C. in about 2 minutes), HexPly® M76, or HexPly® M92 available from HEXCEL® Corporation, Stamford, Conn.; TC250 (cures at a temperature of about 130° C. in about 2 hours) available from TenCate Advanced Composites, Morgan Hill, Calif.; and Nelcote® E-765 (cures at a temperature of about 135° C. in about 2 hours) available from Park Electrochemical Corp, Melville, N.Y. By curing at a relatively low temperature, composite nosecone 20 may include relatively higher-modulus reinforcement elements and relatively tougher polymer-based reinforcement elements that undergo thermal degradation (or are otherwise altered) at relatively higher temperatures (e.g., greater than about 150° C.).

The relatively higher-modulus reinforcement elements may include continuous fibers, short fibers, particulates, or the like. In some examples, the relatively higher-modulus reinforcement elements have a relatively high tensile modulus, such as greater than 60 GPa. Example reinforcement elements that have an elongation at break of less than 6.0% and a tensile modulus of greater than 60 GPa include aromatic polyamide fibers, such as Kevlar®, available from E.I. du Pont de Nemours and Company, Wilmington, Del.; carbon fibers, such as carbon fibers derived from polyacrylonitrile fibers; and some glass fibers, such as E-glass, an alumino-borosilicate glass with less than 1% weight-per-weight alkali oxides or S-glass (an alumino silicate glass excluding CaO and including MgO). In some examples, the tensile modulus of the relatively higher-modulus reinforcement element is greater than about 90 GPa, or greater than about 120 GPa, or greater than about 180 GPa, or greater than about 200 GPa. For example, some carbon fibers have a tensile modulus of between about 225 GPa and about 300 GPa.

In some examples, the relatively higher-modulus reinforcement elements may be relatively brittle, e.g., exhibit a relatively low elongation at break. For example, the relatively higher-modulus reinforcement elements may have an elongation at break of less than about 6.0%. In some examples, the elongation at break is lower than 6.0%, such as less than about 5.0%, or less than about 2.0%. Because of this, while composite nosecone 20 including a matrix material and relatively higher-modulus reinforcement elements may provide significant stiffness and tensile strength to composite nosecone 20, the impact resistance of composite nosecone 20 that includes only a matrix material and relatively higher-modulus reinforcement elements may be relatively low due to the brittleness of composite nosecone 20, and composite nosecone 20 may suffer brittle failure upon impact from a foreign object, such as a bird, hailstones, or the like. Further, the relatively higher-modulus reinforcement elements may be relatively dense. For example, carbon fibers may have a density of around 1.8 $g/cm^3$, aromatic polyamide fibers may have a density of around 1.4-1.5 $g/cm^3$, and glass fibers may have a density of greater than 2.0 $g/cm^3$. For these reasons, composite nosecone 20 includes relatively tougher polymer-based reinforcement elements in addition to relatively higher-modulus reinforcement elements.

The relatively tougher polymer-based reinforcement elements have an elongation at break of greater than 6.0%. By exhibiting a higher elongation at break than the relatively higher-modulus reinforcement elements, the relatively tougher polymer-based reinforcement elements contribute greater toughness to composite nosecone 20. For example, composite nosecone 20 with relatively tougher polymer-based reinforcement elements is more resistant to impact damage, such as damage due to impact from a foreign object, such as a bird, a hailstone, or the like.

In some examples, the relatively tougher polymer-based reinforcement elements have an elongation at break that is greater than that of the matrix material. For example, the elongation at break of the relatively tougher polymer-based reinforcement elements is greater than about 6.0%, such as greater than about 10.0%, greater than about 15.0%, greater than about 20.0%, or greater than about 25.0%. The greater elongation at break of the relatively tougher polymer-based reinforcement elements (compared to the relatively higher-modulus reinforcement elements) allows the relatively tougher polymer-based reinforcement elements to provide at least some structural integrity to composite nosecone 20 even if the matrix material cracks or delaminates from the reinforcement fibers.

The relatively tougher polymer-based reinforcement elements may include, for example, a polyamide; a polyester or polyester terephthalate (PET), such as Dacron®, available from IVISTA, Wichita, Kans., or Vectran®, available from Kuraray Co., Ltd., Tokyo, Japan; a polypropylene, such as a high modulus polypropylene (HMPP), for example Innegra™ S, available from Innegra Technologies™, Greenville S.C.; a polyethylene, such as high density polyethylene, high performance polyethylene, or ultra-high molecular weight polyethylene; spider silk; or the like.

The reinforcement elements may be incorporated in composite nosecone 20 in any desired manner. Each respective reinforcement element may include relatively higher-modulus elements, relatively tougher polymer-based elements, or both. The plurality of relatively higher-modulus reinforcement elements and the plurality of relatively tougher polymer-based reinforcement elements may define at least one reinforcement architecture. A reinforcement architecture includes a particular combination and physical arrangement of materials, such as a matrix material and at least one of a plurality of relatively higher-modulus reinforcement elements or a plurality of relatively tougher polymer-based reinforcement elements. The reinforcement architecture may include strands, braids, weaves, windings, fabric layers, or the like. As discussed above with respect to FIG. 1, strands include one or more tows, and tows include a plurality of fibers. Strands may be configured to form each respective reinforcement including, as discussed above with respect to FIG. 1, a pure braid, pure weave, pure winding, a hybrid braid, hybrid weave, hybrid winding, commingled braid, commingled weave, commingled winding, or the like. Composite nosecone 20 may include one or more reinforcement architectures. The reinforcement architecture for a region of composite nosecone 20 may be selected according to desired properties of that portion of composite nosecone 20, such as mechanical properties.

For example, composite nosecone 20 (or a reinforcement architecture in composite nosecone 20) may include a uniform reinforcement architecture. The uniform reinforcement architecture includes a composite material which is substantially uniform mixture of a matrix material, a plurality of relatively higher-modulus reinforcement elements, and a plurality of relatively tougher polymer-based reinforcement elements, e.g., throughout an entire volume of nosecone 20. This may provide substantially uniform mechanical properties to composite nosecone 20 (or a reinforcement architecture in nosecone 20), e.g., substantially uniform stiffness, toughness, or the like.

In some examples, composite nosecone 20 may include hybrid reinforcement elements. Hybrid reinforcement elements include first strands of relatively higher-modulus fibers and second strands of relatively tougher polymer-based fibers. The first strands of relatively higher-modulus fibers and second strands of relatively tougher polymer-based fibers are at least one of braided, interwoven, or wound together to form a hybrid reinforcement element. For example, a fabric may include warp yarns that include first strands of relatively higher-modulus fibers and a weft yarns that include second strands of relatively tougher polymer-based fibers.

In other examples, composite nosecone 20 may include commingled reinforcement elements. Commingled reinforcement elements include strands having both relatively higher-modulus fibers and relatively tougher polymer-based fibers. In some examples, composite nosecone 20 includes commingled reinforcement elements in which commingled strands are braided, interwoven, or wound together to form a reinforcement element. In other examples, both commingled reinforcement elements (or braids, weaves, windings, or fabrics that include commingled reinforcement elements) and hybrid reinforcement elements may be incorporated in a reinforcement element of composite nosecone 20. For example, a fabric may include warp yarns that include hybrid reinforcement elements and a weft yarns that include commingled reinforcement elements. As another example, a first fabric layer may include hybrid reinforcement elements and a second fabric layer may include commingled reinforcement elements. Other combinations of hybrid reinforcement elements, commingled reinforcement elements, or both are contemplated. Additionally, or alternatively, the relatively higher-modulus reinforcement elements, the relatively tougher polymer-based reinforcement elements, or both may include continuous fibers or filaments, chopped fibers or filaments, or the like.

By including both relatively higher-modulus reinforcement elements and relatively tougher polymer-based reinforcement elements, composite nosecone 20 may possess increased toughness (e.g., reduce brittleness) compared to a nosecone that does not include relatively tougher polymer-based reinforcement elements, while still possessing relatively high stiffness and tensile strength. Further, as the relatively tougher polymer-based reinforcement elements may be less dense than the relatively higher-modulus reinforcement elements, composite nosecone 20 may be lighter than a similar nosecone that includes only relatively higher-modulus reinforcement elements.

In some examples, composite nosecone 20 may include at least one first region and at least one second region. The ratio of relatively tougher polymer-based reinforcement elements to relatively higher-modulus reinforcement elements in a given region may range from zero (no relatively tougher polymer-based reinforcement elements and only relatively higher-modulus reinforcement elements) to infinite (only relatively tougher polymer-based reinforcement elements and no relatively higher-modulus reinforcement elements). For example, the at least one first region may include a greater ratio of relatively higher-modulus reinforcement elements to relatively tougher polymer-based reinforcement elements than a ratio of relatively higher-modulus reinforcement elements to relatively tougher polymer-based reinforcement elements in the at least one second region. In some implementations, the at least one first region and the at least one second region may define one or more layers of composite nosecone 20. For example, the body of composite nosecone 20 may include a plurality of layers. Each of the plurality of layers may include at least one of a first region of the at least one first region or a second region of the at least one second region. By including at least one first region and at least one second region, composite nosecone 20 may include at least one first region of relatively high stiffness and tensile strength, and at least one second region of increased toughness.

Additionally, or alternatively, composite nosecone 20 may include a plurality of reinforcement architectures, such as a first region that includes a first reinforcement architecture and a second region that includes a second reinforcement architecture. The first reinforcement architecture may be selected to provide desired properties to the first region and the second reinforcement architecture may be selected to provide desired properties to the second region. For example, at least one first region may include a greater ratio of relatively higher-modulus reinforcement elements to relatively tougher polymer-based reinforcement elements than a ratio of relatively higher-modulus reinforcement elements to relatively tougher polymer-based reinforcement elements in at least one second region. In this way, the first region possesses greater stiffness than the second region, while the second regions possesses greater toughness than the first region.

Figure 2:
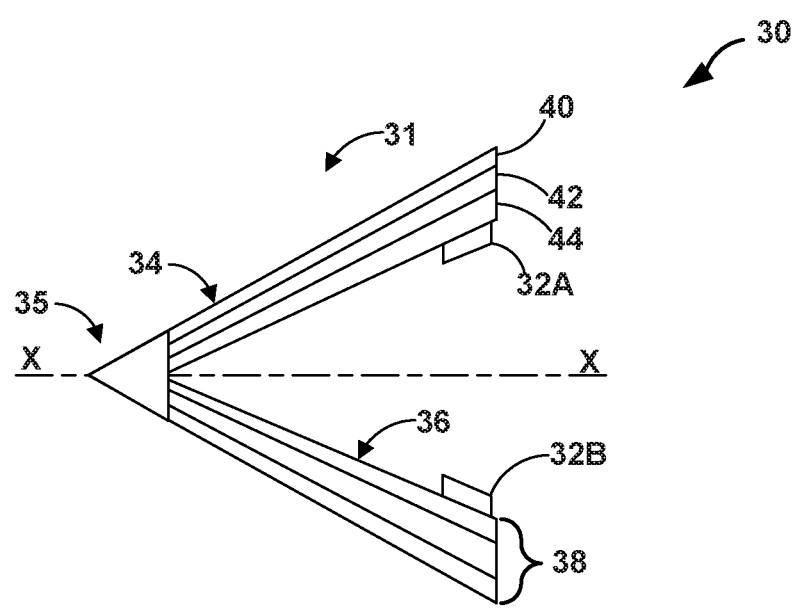
FIG. 2 is a schematic and conceptual diagram illustrating a longitudinal cross-section view of an example composite nosecone that includes layered reinforcing elements.

FIG. 2 is a schematic and conceptual diagram illustrating a longitudinal cross-section view of an example composite nosecone 30 that includes layered regions 40, 42, and 44 of reinforcing elements. Composite nosecone 30 includes a composite material that includes both relatively higher-modulus reinforcement elements and relatively tougher polymer-based reinforcement elements, as described above with reference to FIG. 1. A composite material may provide greater strength (e.g., tensile strength) than a metallic material while also being lighter.

Composite nosecone 30 includes a body 31. Body 31 defines an outer surface 34 which directs air radially-outward from the center of the bladed wheel 12 (FIG. 1) and into the blades of the fan along the central axis (e.g., X-X axial direction). Body 31 also defines an inner surface 36. Body 31 includes a sidewall defining a diameter of body 31. The sidewall of body 31 may be tapered such that the thickness of the sidewall increases along central axis X-X from a forward side of body 31 to an aft side of body 31. Composite nosecone 30 includes tip 35. Tip 35 may include a rubber tip or any other suitable material for the tip of composite nosecone 30. Composite nosecone 30 includes at least one attachment area integrally formed with body 31. Composite nosecone 30 may be secured to a bladed wheel of a fan assembly by a fairing (e.g., an annular frustum configured to surround a portion of composite nosecone 30 and secure composite nosecone 30 to the bladed wheel) or one or more attachment areas, such as attachment areas 32A and 32B. Attachment areas 32A and 32B may be integrally formed with body 31, or otherwise affixed to body 31, to extend radially inward from inner surface 36 and be configured to secure nosecone 30 to bladed wheel 12. In other examples, attachment areas 32A and 32B may be integrally formed with body 31, or otherwise affixed to body 31, to extend radially outward from outer surface 34 and be configured to secure nosecone 30 to the bladed wheel 12. Attachment areas 32A and 32B may include any suitable geometry for attaching composite nosecone 30 to bladed wheel 12. For example, attachment areas 32A and 32B interlock or physically contact with complementary pads on bladed wheel 12. In other examples, attachment areas 32A and 32B and bladed wheel 12 may include other mechanical features for attaching composite nosecone 30 to bladed wheel 12, such as a support ring or the like.

Composite nosecone 30 may include a plurality of layers 38. For example, as shown in FIG. 2, composite nosecone 30 includes three layers including outer layer 40, middle layer 42, and inner layer 44. In some examples, composite nosecone 30 includes fewer layers, such as, for example, one or two layers. In other examples, composite nosecone 30 includes more than three layers.

Plurality of layers 38 includes a composite material that includes a matrix material, a plurality of relatively higher-modulus reinforcement elements, and a plurality of relatively tougher polymer-based reinforcement elements. The plurality of relatively higher-modulus reinforcement elements and the plurality of relatively tougher polymer-based reinforcement elements may define at least one reinforcement architecture. A reinforcement architecture includes a particular combination and physical arrangement of materials, such as a matrix material and at least one of a plurality of relatively higher-modulus reinforcement elements or a plurality of relatively tougher polymer-based reinforcement elements. Composite nosecone 30 may include one or more reinforcement architectures. The reinforcement architecture for a region of composite nosecone 30 may be selected according to desired properties of that portion of composite nosecone 30, such as mechanical properties.

In some examples, an at least one first region includes outer layer 40 and inner layer 44, and an at least one second region may include middle layer 42. The at least one first region may include a greater ratio of relatively higher-modulus reinforcement elements to relatively tougher polymer-based reinforcement elements compared to a ratio of relatively higher-modulus reinforcement elements to relatively tougher polymer-based reinforcement elements in the at least one second region. In this way, the at least one first region is stronger than the at least one second region. For example, outer layer 40 and inner layer 44 may better resist centrifugal forces acting upon composite nosecone 30 during operation of gas turbine engine 10 compared to middle layer 42. The at least one second region may include middle layer 42. The at least one second region may include a greater ratio of relatively tougher polymer-based reinforcement elements to relatively higher-modulus reinforcement elements compared to a ratio of relatively tougher polymer-based reinforcement elements to relatively higher-modulus reinforcement elements in the at least one first region. In this way, the at least one second region is tougher than the at least one first region. For example, middle layer 42 may improve the ability of composite nosecone 30 to absorb impacts compared to outer layer 40 or inner layer 44.

In some examples, an at least one first region includes middle layer 42, and an at least one second region may include outer layer 40 and inner layer 44. The at least one first region may include a greater ratio of relatively higher-modulus reinforcement elements to relatively tougher polymer-based reinforcement elements compared to a ratio of relatively higher-modulus reinforcement elements to relatively tougher polymer-based reinforcement elements in the at least one second region. In this way, the at least one first region is stronger than the at least one second region. For example, middle layer 42 may better resist centrifugal forces acting upon composite nosecone 30 during operation of gas turbine engine 10 compared to outer layer 40 and inner layer 44. The at least one second region may include outer layer 40 and inner layer 44. The at least one second region may include a greater ratio of relatively tougher polymer-based reinforcement elements to relatively higher-modulus reinforcement elements compared to a ratio of relatively tougher polymer-based reinforcement elements to relatively higher-modulus reinforcement elements in the at least one first region. In this way, the at least one second region is tougher than the at least one first region. For example, outer layer 40 or inner layer 44 may improve the ability of composite nosecone 30 to absorb impacts compared to middle layer 42.

In some examples, nosecone 30 may include other materials in addition to a matrix material, relatively higher-modulus reinforcement elements, and relatively tougher polymer-based reinforcement elements. For example, a composite nosecone may include a low-density material, an erosion resistant coating, or both. A low-density core may be included between outer layer 40 and inner layer 44, e.g., all or a portion of middle layer 42 may include a low-density material. As one example, a low-density material may be used as middle layer 42, except in attachment areas where a chopped fiber reinforcement architecture may be used. The low-density material of a low-density core may include a foam, balsa wood, birch wood, a honeycomb material, or the like. The low-density core may reduce weight of nosecone 30, while the sandwich-type structure of reinforcement architectures on either side of the low-density core may provide sufficient mechanical properties to nosecone 30. Additionally, or alternatively, an erosion resistant coating may be included on outer surface 34 of nosecone 30. An erosion resistant coating may be applied in liquid form or may be an erosion-resistant polymeric film that is adhered or co-cured to nosecone 30. In some examples, an erosion resistant coating may include a polyurethane, such as a polyurethane film available under the trade designation 3M™ Polyurethane Protective Tape 8734NA. In examples in which an erosion resistant coating is adhered to nosecone 30, the erosion resistant coating may be replaceable upon damage to the erosion resistant coating while reducing or substantially preventing erosion damage to the underlying nosecone 30. In some examples, the erosion resistant coating may have a relatively high elongation at break (e.g., similar to the relatively tougher polymer-based reinforcement elements), which may contribute to toughness of nosecone 30.

Figure 3:
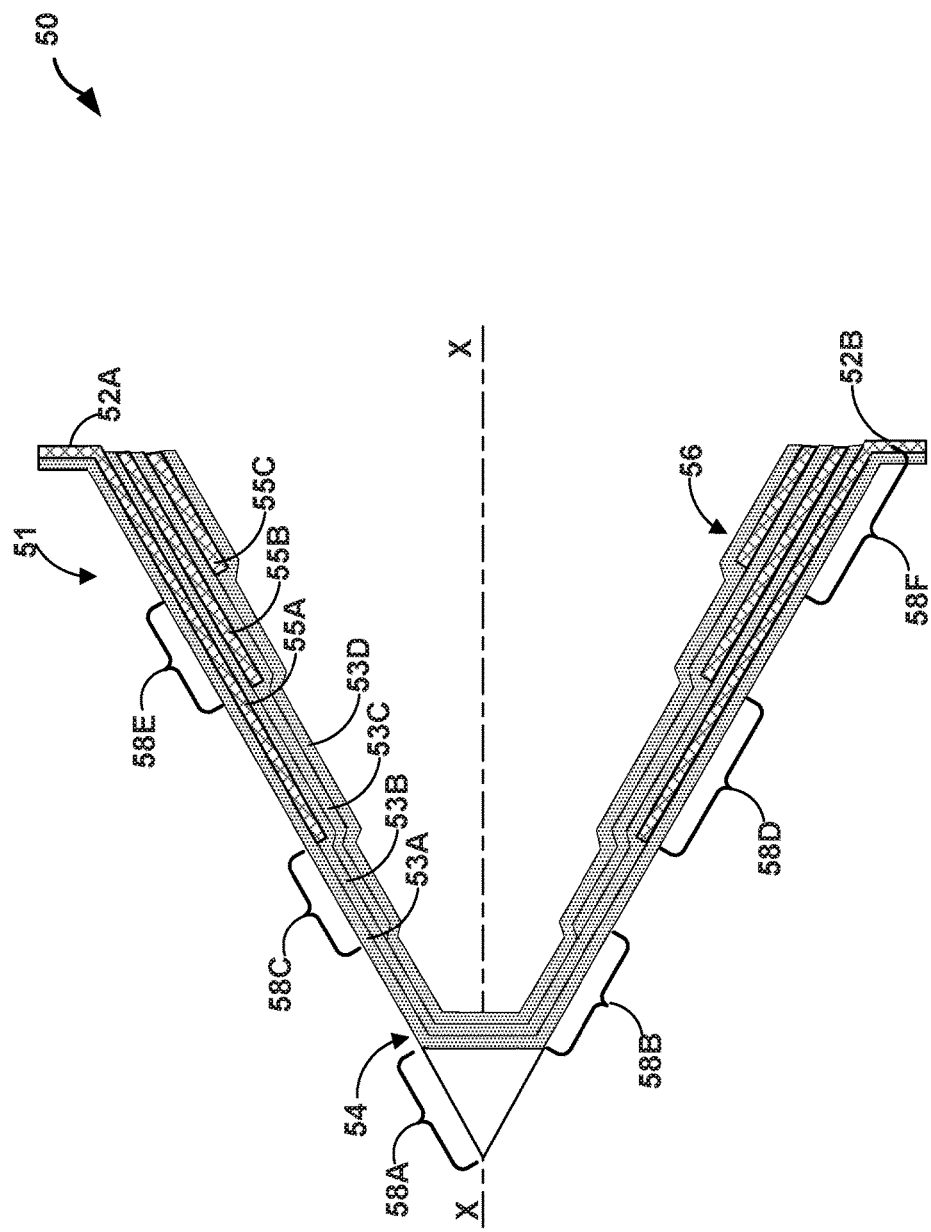
FIG. 3 is a schematic and conceptual diagram illustrating a longitudinal cross-section view of an example composite nosecone that include annular shaped regions of layered reinforcing elements.

In other examples, a composite nosecone may include annular shaped regions of layered reinforcement elements, the number of layers, compositions of layers, or both varying for at least one annular region. For example, FIG. 3 is a schematic and conceptual diagram illustrating a longitudinal cross-section view of an example composite nosecone 50 that includes a plurality of annular shaped regions of layered reinforcing elements 58A, 58B, 58C, 58D, 58E, and 58F (collectively, "regions 58"). A plurality of first layers 53A, 53B, 53C, and 53D and a plurality of second layers 55A, 55B, and 55C that are arranged to define regions 58. Composite nosecone 50 is the same or substantially similar to composite nosecone 20 discussed above with respect to FIG. 1, except for the differences described herein. For example, composite nosecone 50 includes a body 51 defining an outer surface 54 and an inner surface 56. One or more attachment areas, e.g., attachment areas 52A and 52B, may be integrally formed with body 51, or otherwise affixed to body 51, to extend from outer surface 54 (as shown in FIG. 3) or inner surface 56 (similar to FIG. 2).

Rather than layers extending substantially parallel to the plane of the outer surface or inner surface as shown in the example of composite nosecone 30 in FIG. 2, composite nosecone 50 includes a regions 58. Each respective region of the regions 58 is defined by a respective number first layers 53A, 53B, 53C, and 53D and a respective number of second layers 55A, 55B, and 55C.

In some examples, first layers 53A, 53B, 53C, and 53D and second layers 55A, 55B, and 55C define substantially parallel layers. In other examples, each respective layer of first layers 53A, 53B, 53C, and 53D and second layers 55A, 55B, and 55C define nonparallel layers. For example, first layers 53A, 53B, and 53D are substantially continuous from the forward side to aft side of nosecone 50. First layer 53C and second layers 55A, 55B, and 55C extend only in a portion of body 51, e.g., from the aft side of nosecone 50 to a boundary defining a respective region of regions 58. First layer 53A, 53B, and 53D are substantially directly adjacent neighboring layers to reduce delamination of each respective layer during operation of composite nosecone 50.

Each respective region of the regions 58 extends substantially in the radial direction from the inner surface 56 to outer surface 54 of nosecone 50 and around the circumference of the body 51 of nosecone 50 (e.g., defining annular shape regions 58). Each of respective region of the plurality of regions 58 defines a forward position of the respective region and an aft position of the respective region, relative to the central axis (X-X) along body 51. For example, region 58A includes a forward position defining the forward side of body 51 and an aft position longitudinally adjacent to the forward position of region 58B. Region 58B extends from the forward position of region 58B to an aft position longitudinally adjacent to the forward position of region 58C. Regions 58C, 58D, and 58E are similarly situated. The aft portion of region 58E is adjacent to the forward position of region 58F. The aft position of region 58F defines the aft side of body 51. Each region of the plurality of regions 58 may be directly adjacent or include another region between two adjacent regions (e.g., a bonding region to increase the mechanical or chemical bonding of adjacent regions). Similarly, each layer of each region of the plurality of regions 58 may be directly adjacent or include another layer between two adjacent layers (e.g., a bonding region to increase the mechanical or chemical bonding of adjacent layers).

In some examples, the plurality of regions 58 may define substantially equal portions of body 51 along the central axis (X-X). In other examples, the plurality of regions 58 may define unequal portions of body 51 along the central axis (X-X). Body 51 includes a sidewall defining a diameter of body 51. The sidewall may be tapered such that the thickness of the sidewall increases along central axis X-X from a forward side of body 51 to an aft side of body 51. For example, region 58A may define a minimum thickness of body 51, region 58H may define a maximum thickness of body 51, and regions 58B, 58C, 58D, and 58E may each define an intermediate thickness between region 58A and region 58F.

Each respective layer of first and second layers 53A, 53B, 53C, 53D, 55A, 55B, and 55C may include similar or dissimilar materials. For example, each respective layer of first and second layers 53A, 53B, 53C, 53D, 55A, 55B, and 55C may include one or more reinforcement elements, each respective reinforcement element having a respective a ratio of matrix material, relatively tougher polymer-based reinforcement elements, and relatively higher-modulus reinforcement elements to provide a desired mechanical property of the respective first reinforcement element. The ratio of relatively tougher polymer-based reinforcement elements to relatively higher-modulus reinforcement elements in a given layer of first and second layers 53A, 53B, 53C, 53D, 55A, 55B, and 55C may range from zero (no relatively tougher polymer-based reinforcement elements and only relatively higher-modulus reinforcement elements) to infinite (only relatively tougher polymer-based reinforcement elements and no relatively higher-modulus reinforcement elements). For example, region 58A may include a greater ratio of relatively tougher polymer-based reinforcement elements to relatively higher-modulus reinforcement elements compared the ratio of relatively tougher polymer-based reinforcement elements to relatively higher-modulus reinforcement elements included within regions 58B-58F. In other examples, region 58A may include a rubber tip or any other suitable material for the tip of composite nosecone 50. Attachment areas 52A and 52B may include a greater ratio of relatively tougher polymer-based reinforcement elements to relatively higher-modulus reinforcement elements compared the ratio of relatively tougher polymer-based reinforcement elements to relatively higher-modulus reinforcement elements included within regions 58A-58F.

Conversely, regions 58B-58F may include a greater ratio of relatively higher-modulus reinforcement elements to relatively tougher polymer-based reinforcement elements compared the ratio of relatively higher-modulus reinforcement elements to relatively tougher polymer-based reinforcement elements included within region 58A and attachment areas 52A and 52B. As such, region 58A may be tougher and better able to absorb energy from strikes by foreign objects, e.g. hailstones and birds, due to the higher ratio of relatively tougher polymer-based reinforcement elements compared to relatively higher-modulus reinforcement elements included in the reinforcement architecture in that region, while regions 58B-58F may be stronger and stiffer, such that they may be better able to resist the centrifugal forces acting upon nosecone 50 and, consequently, may be better able to resist deformation due to the higher ratio of higher-modulus reinforcement elements compared to low-modulus reinforcement elements in that region. In this way, composite nosecone 50 may be configured to be tougher in selected areas or at selected depths of composite nosecone 50, or to be stiffer in selected areas or at selected depths of composite nosecone 50.

Additionally, each respective layer of first and second layers 53A, 53B, 53C, 53D, 55A, 55B, and 55C may taper in thickness. For example, each respective layer of first and second layers 53A, 53B, 53C, 53D, 55A, 55B, and 55C may be thinner near the forward side of the respective layer and thicker near the aft side of the respective layer. In this way, composite nosecone 50 may be configured to be tougher in selected forward or aft areas of composite nosecone 50, or to be stiffer in selected forward or aft areas of composite nosecone 50.

Figure 4:
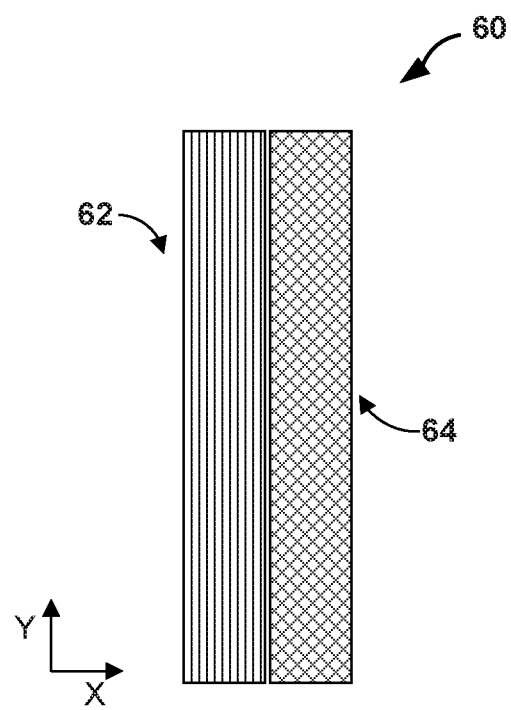
FIG. 4 is a schematic and conceptual diagram illustrating an example a reinforcing architecture including a first reinforcing element and a second reinforcing element.

A respective area of a respective layer may include a selected reinforcement architecture to provide a desired strength and desired toughness to the respective position and depth of the composite nosecone. FIG. 4 is a schematic and conceptual diagram illustrating an example region 60 of an example composite nosecone that includes a reinforcing architecture including a first reinforcing element 62 and a second reinforcing element 64. First reinforcing element 62 includes only relatively higher-modulus reinforcement elements and second reinforcing element 64 includes only relatively tougher polymer-based reinforcement elements. In other examples, each of first reinforcing element 62 and second reinforcing element 64 include a selected ratio of relatively tougher polymer-based reinforcement elements and relatively higher-modulus reinforcement elements, and the ratios may be different. For example, first reinforcing element 62, second reinforcing element 64, or both may include one or more both relatively tougher polymer-based reinforcement elements and relatively higher-modulus reinforcement elements reinforcing elements, which may include strands of relatively tougher polymer-based reinforcement material interwoven or braided with relatively higher-modulus reinforcement material, hybrid strands, or commingled strands.

In the example of FIG. 4, first reinforcing element 62 includes a strand of relatively higher-modulus reinforcement elements and second reinforcing element 64 includes a strand of relatively tougher polymer-based reinforcement elements. In other examples, first reinforcing element 62 and second reinforcing element 64 may include other reinforcing architectures. For example, first reinforcing element 62 may include a commingled strand having at least a first tow the includes first reinforcing elements (e.g., relatively higher-modulus reinforcement elements) and a second tow that includes second reinforcing elements (e.g., relatively tougher polymer-based reinforcement elements). The fibers of first reinforcing element 62 and second reinforcing element 64 may extend substantially in the same direction (e.g., the y-axis as shown in FIG. 4). In this way, region 60 may define a unidirectional reinforcement architecture, such as, for example, a unidirectional tape that includes at least a first reinforcing element 62 and second reinforcing element 64. In some examples, a unidirectional reinforcement architecture is used for local buildup or reinforcement of selected areas of a composite nosecone, such as attachment areas. Including unidirectional reinforcement architectures in the selected areas of the composite nosecone may improve the mechanical properties of the selected areas while reducing manufacturing costs or time compared to using other reinforcement architectures in the selected areas of the composite nosecone.

Although shown in FIG. 4 as one first reinforcing element 62 and one second reinforcing element, region 60 may include a plurality of first reinforcing elements 62 and a plurality of second reinforcing element 64. For example, region 60 may include a repeating or a random arrangement of a plurality of first reinforcing elements 62 and a plurality of second reinforcing elements. In this way, region 60 may be selected to provide a reinforcement architecture having desired mechanical properties, such as, a desired toughness and a desired stiffness.

Figure 5:
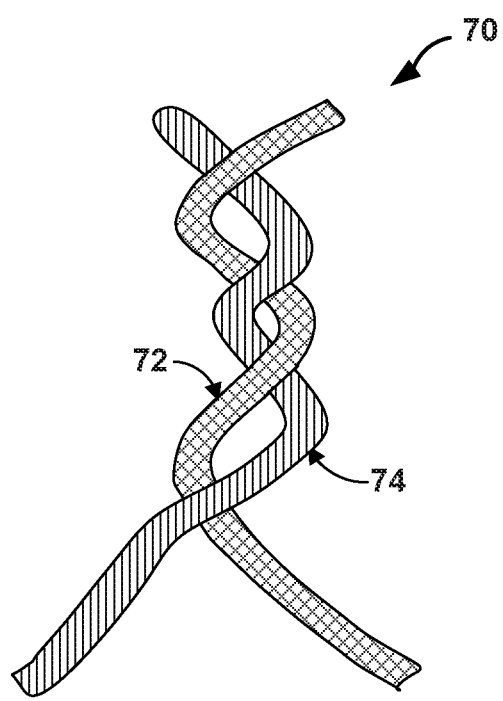
FIG. 5 is a conceptual diagram illustrating an example braided reinforcement architecture including a first reinforcing element and a second reinforcing element.

FIG. 5 is a conceptual diagram illustrating an example braid 70 that includes a braided reinforcement architecture including a first reinforcing element 72 (e.g., a first strand of a first reinforcing element) and a second reinforcing element 74 (e.g., a second strand of a second different reinforcing element). As discussed above with respect to FIG. 4, first reinforcing element 72 and second reinforcing element 74 may include only relatively higher-modulus reinforcement elements, only relatively tougher polymer-based reinforcement elements, or a selected ratio of both, including, for example, hybrid or commingled reinforcing elements. Although FIG. 5 shows braid 70 including first reinforcing element 62 and second reinforcing element 64, a plurality of reinforcing elements may be braided to form braid 70. For example, braid 70 may include more than two reinforcing elements, such as, tens or hundreds of reinforcing elements. As shown in FIG. 5, braid 70 is substantially linear. In other examples, braid 70 may include other reinforcing architectures, including, complex geometries such as cylinders, cones, conical frustums, biaxial braid, or triaxial braid. For example, braid 70 may define at least a portion of the shape of a body of a composite nosecone. Any suitable braiding technique may be used to form braid 70 including, but not limited to, 2-D braiding, 3-D braiding, circular braiding, over-braiding, four-step braiding, two-step braiding, rotary braiding, and the like.

Braid 70 may improve load distribution compared to other reinforcing architectures (e.g., unidirectional tapes or filament winding). As one example, braided region 70 may reduce crack propagation by arresting cracking at the intersection of first reinforcing element 72 and second reinforcing element 74. In this way, by including a braided region 70 in a composite nosecone (e.g., a layer or region of the composite nosecone), the composite nosecone may be configured to better absorb impacts.

Figure 6A:
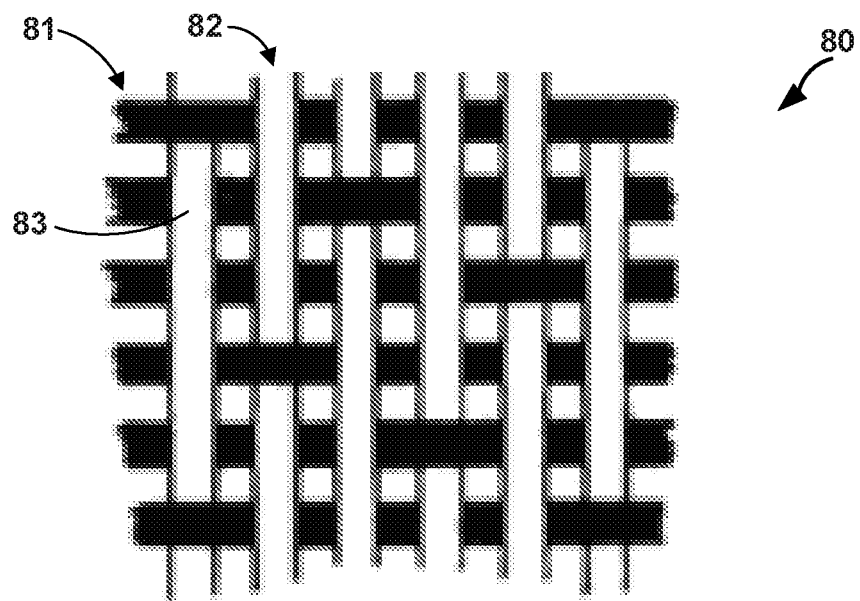
FIG. 6A is a conceptual diagram illustrating an example 5-harness satin weave that includes a woven reinforcement architecture including first reinforcing elements and second reinforcing elements.

FIG. 6A is a conceptual diagram illustrating an example 5-harness satin weave 80 that includes a woven reinforcement architecture including first reinforcing elements 81 and second reinforcing elements 82. First reinforcing elements 81 include warp yarns of weave 80. Second reinforcing elements 82 include weft yarns (e.g., fill) of weave 80. First reinforcing element 81 and second reinforcing element 82 may intersect at pick 83. In some examples, first reinforcing element 81 and second reinforcing element 82 may include the same material, e.g., relatively higher-modulus reinforcement elements, relatively tougher polymer-based reinforcement elements, or a selected ratio of both, including, for example, hybrid or commingled reinforcing elements. In other examples, first reinforcing element 81 and second reinforcing element 82 may include different materials. For example, as discussed above with respect to FIG. 4, first reinforcing element 81 and second reinforcing element 82 may include different relatively higher-modulus reinforcement elements, relatively tougher polymer-based reinforcement elements, or a selected ratio of both, including, for example, hybrid or commingled reinforcing elements. Weave 80 include a 5-harness satin weave, however, weave 80 may include any weave pattern or combination of weave patterns, including, but not limited to, two-by-two twill weave, satin weave, plain weave, leno weave, and other patterned weaves. Additionally, weave 80 may include any suitable thread count. For example, thread count of weave 80 may be greater than ten-by-ten, such as, twenty-by-twenty or thirty-by-thirty. Weave 80 may include tows (e.g., yarns) of any suitable number of fibers per bundle. For example, weave 80 may include greater than 1,000 fibers per bundle (e.g., 1 k tow), greater than 3,000 fibers per bundle (3 k tow), greater than 10,000 fibers per bundle (10 k tow), or greater than 50,000 fibers per bundle (50 k tow).

Weave 80 may improve load distribution compared to other reinforcing architectures (e.g., unidirectional tapes or filament winding). For example, weave 80 may reduce crack propagation by arresting cracking at a respective pick (e.g., pick 83) of first reinforcing element 81 and second reinforcing element 82. Additionally, or alternatively, weave 80 may include warp yarns, weft yarns, or both that include a selected ratio of relatively higher-modulus reinforcement elements, relatively tougher polymer-based reinforcement elements, or a selected ratio of both (e.g., commingled reinforcing elements). For example, at least a portion of warp yarns or weft yarns may be selected to include a ratio of relatively higher-modulus reinforcement elements, relatively tougher polymer-based reinforcement elements, or both to provide a desired toughness, stiffness, or both in a selected layer or region of a composite nosecone. In this way, by including weave 80 in a composite nosecone (e.g., a layer or region of the composite nosecone), the composite nosecone may be configured to better absorb impacts or withstand other mechanical forces during operation of a turbine with the composite nosecone.

Figure 6B:
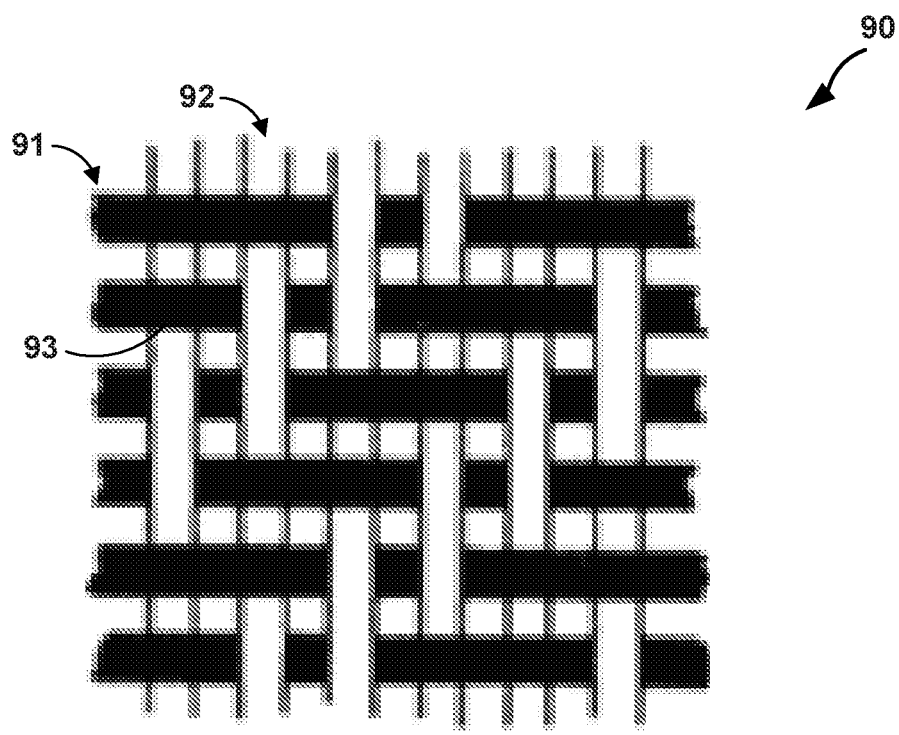
FIG. 6B is a conceptual diagram illustrating an example two-by-two twill weave that includes a woven reinforcement architecture including first reinforcing elements and second reinforcing elements.

FIG. 6B is a conceptual diagram illustrating an example 2/2 twill weave 90 that includes a woven reinforcement architecture including first reinforcing elements 91 and second reinforcing elements 92. Weave 90 may be the same or substantially similar to weave 80 discussed above, except for the differences described herein. Weave 90 may be the same or substantially similar to weave 80 discussed above, aside from being a 2/2 twill weave 95.

Figure 7:
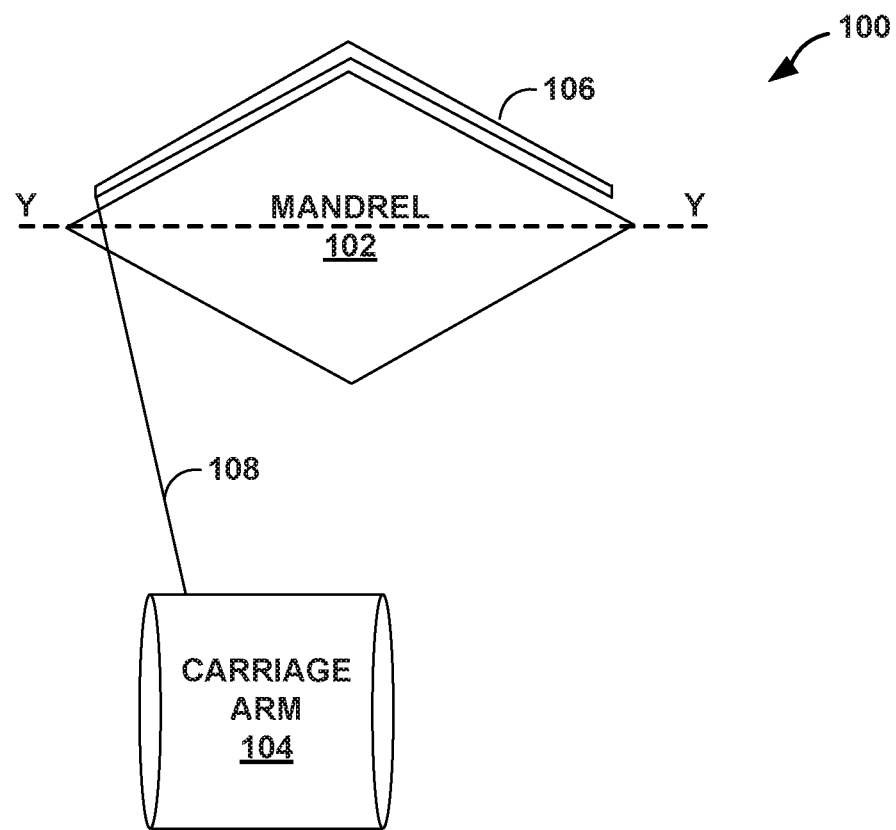
FIG. 7 is a conceptual diagram illustrating an example filament winding apparatus for mandrel winding a composite nosecone.

In addition to braided and woven architectures discussed above, filament winding may form layers or regions of a composite nosecone. FIG. 7 is a conceptual diagram illustrating an example filament winding apparatus 100 for mandrel winding a composite nosecone 106. A filament winding apparatus includes a mandrel 102 and a carriage arm 104. Mandrel 102 includes an elongated body extending along a longitudinal axis Y-Y and may include a portion of the shape of a composite nosecone. For example, at least a portion of mandrel 104 may be shaped as a portion of a cone or a conical frustum. Mandrel 102 is configured to rotate about longitudinal axis Y-Y. Carriage arm 104 includes a winding eye through which one or more rovings 108 dispense onto mandrel 102. In some examples, filament winding apparatus 100 includes more than one carriage arm that may move independent of each other. Rovings 108 include one or more strands. As discussed above, each of the one or more strands may include pure strand, hybrid strand, or a commingled strand.

During winding, carriage arm 104 is configured to travel parallel to the longitudinal axis Y-Y. Rovings 108 are wound onto the mandrel to form a layer over the surface of mandrel 102. As rovings 108 travel to mandrel 102, rovings 108 are impregnated with a matrix material, e.g., a matrix material as discussed above with respect to FIG. 1. For example, rovings 108 may be submerged in or coated with the matrix material. The orientation of rovings 108 (e.g., fiber angle) may be selected based on the rotational speed of mandrel 102 and translational speed of carriage arm 104.

Figure 8:
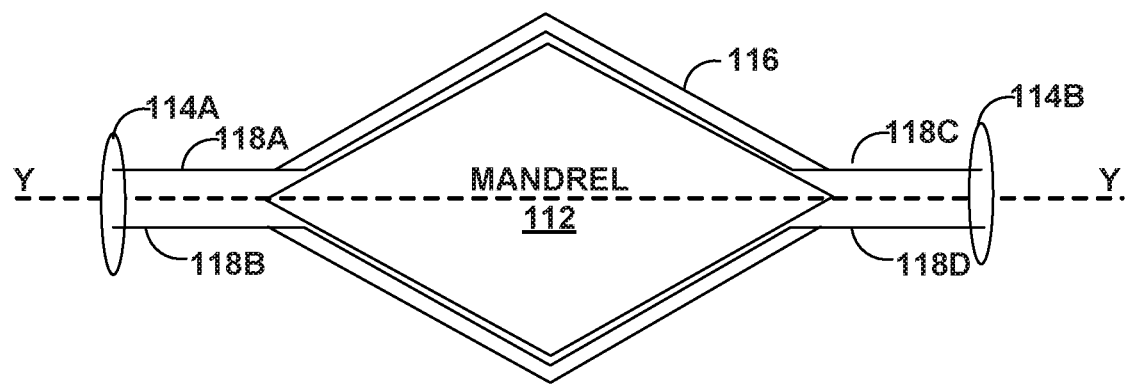
FIG. 8 is a conceptual diagram illustrating an example over-braid on a mandrel.

Like mandrel winding, a braided reinforcement architecture, as discussed above, may be formed on a mandrel. Any suitable braiding technique may be used to form a braided reinforcement architecture on a mandrel. As one example, a braided reinforcement architecture may be formed on a mandrel by over-braiding. For example, FIG. 8 is a conceptual diagram illustrating an example over-braid 116 on a mandrel 112. At least a portion of mandrel 112 may be shaped as at least a portion of a composite nosecone. The reinforcement elements 118A, 118B, 118C, and 118D may be delivered from a single carriage, or as shown in FIG. 8, two carriages 114A and 114B (e.g., bobbin carriage, rotating carriage, or the like) to mandrel 112 in a selected over-braid configuration to form at least a portion of the body of a composite nosecone.

In some examples, the braid may be changed or modified in selected regions of the composite nosecone to improve mechanical properties of the composite nosecone. For example, the braid may include fewer layers near the forward side of the composite nosecone and more layers near the aft side of the composite nosecone to increase the strength of the aft side of the composite nosecone. Additionally or alternatively, the braid may include additional layers near attachment areas to increase the strength of the attachment areas, aft side of the nosecone to improve the impact resistance of the aft side of the nosecone, or the like. Additionally or alternatively, the braid may include a braid over other layers or regions, such as, for example, layers or regions including woven fabric. In this way, the braiding technique may be configured to provide a composite nosecone having a selected strength in each region of a plurality of regions of the composite nosecone.

Figure 9:
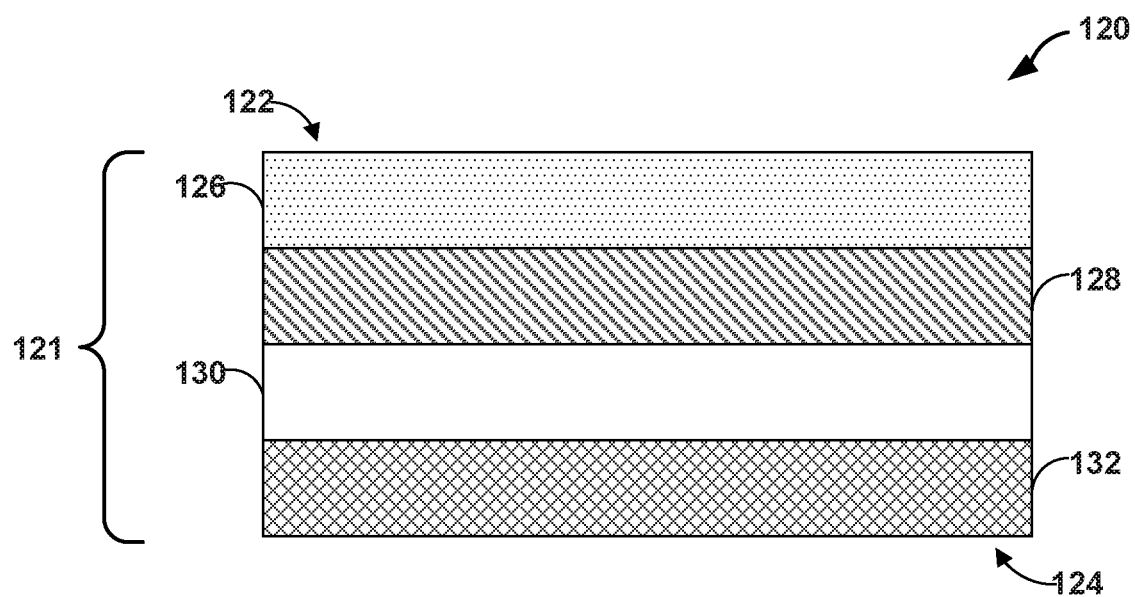
FIG. 9 is a conceptual diagram illustrating an example composite nosecone portion that includes a plurality of layers.

Any one or more reinforcement architectures, including braids, weaves, and windings, as discussed above, may be combined to form layers or regions of a composite nosecone. FIG. 9 is a conceptual diagram illustrating an example composite nosecone portion 120 that includes a plurality of layers 121. In some examples, nosecone portion 120 may include a respective region of a plurality of regions of a composite nosecone. The plurality of layers 121 defines a first major surface 122 and a second major surface 124. For example, first major surface 122 may include an outer surface of the composite nosecone. Similarly, second major surface 124 may include the inner surface of the composite nosecone. As shown in FIG. 9, nosecone portion 102 includes first layer 126, second layer 128, third layer 130, and fourth layer 132. In other examples, nosecone portion 120 may include few layers or additional layers. Each of first layer 126, second layer 128, third layer 130, and fourth layer 132 may include any of the above-mentioned reinforcement architectures. By enabling selection of different reinforcement architectures for each respective layer of the plurality of layers 122, nosecone portion 120 may be configured to provide a desired strength, a desired toughness, or both; reduce the weight of a nosecone, or reduce manufacturing costs.

Figure 10:
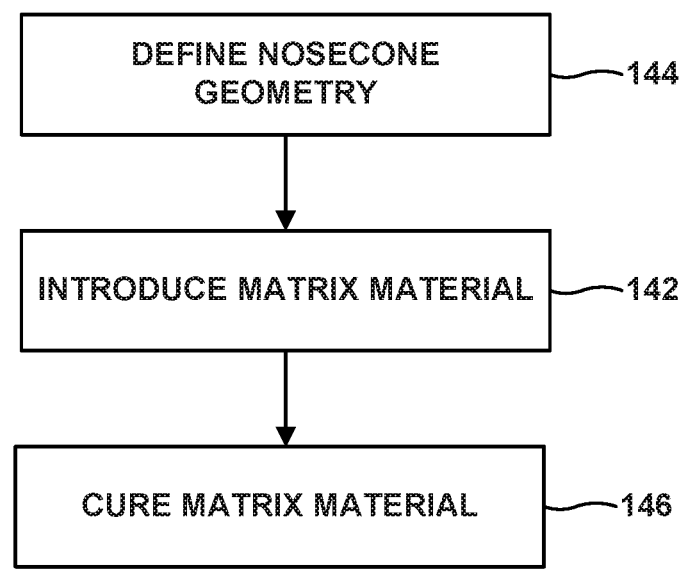
FIG. 10 is a flow diagram illustrating an example technique for forming a composite nosecone.

The composite nosecones described herein may be formed using a variety of techniques, including for example, pre-preg layup and cure, placement of fibers by overbraiding or filament winding or 3-D pre-form and then using resin transfer molding, or the like. FIG. 10 is a flow diagram illustrating an example technique for forming a composite nosecone. The technique of FIG. 10 will be described with reference to nosecone 30 of FIG. 2, although one of ordinary skill in the art will appreciate that similar techniques may be used to form other nosecones, e.g., nosecone 50 of FIG. 3, nosecone portion 120 of FIG. 9, and the like.

The technique of FIG. 10 includes defining a geometry of nosecone 30 (144). The geometry of nosecone 30 may be defined using one or more techniques. For example, braided, woven, or wound reinforcement elements may be disposed within or about a mold, mandrel, or the like, to define a shape of at least a portion of nosecone 30. As another example, chopped reinforcement elements may be deposited in a mold, where the mold defines a shape of at least a portion of nosecone 30. In some examples, two or more of these techniques may be combined to define a geometry of nosecone 30. For example, braided, woven, or wound reinforcement elements may be laid up in a mold, braided or wound around a mandrel, or both, then chopped fibers may be disposed to fill the mold, e.g., for attachment areas or other features of the nosecone.

In some examples, defining the geometry of nosecone 30 (144) may include positioning the reinforcement elements in one or more of selected orientations, selected regions, or both. For example, as described above, in some examples, nosecone 30 may include a plurality of reinforcement architectures, a plurality of layers, or a plurality of regions. In this way, defining the geometry of nosecone 30 (144) may include positioning the relatively higher-modulus reinforcement elements and the relatively tougher polymer-based reinforcement elements in selected orientations, selected regions of nosecone 30, or both to define the selected reinforcement architectures as well as layers, regions, or both of a selected strength, toughness, or both.

The technique in FIG. 10 includes introducing a matrix material around the reinforcement elements (142). In some examples, the matrix material (e.g., an uncured form of the matrix material) may be introduced around at least some of the reinforcement elements prior to defining the geometry of nosecone 30 (144). For example, at least some of the reinforcement elements (relatively higher-modulus reinforcement fibers, relatively tougher polymer-based reinforcement fibers, or both) may be in a braided or woven pre-impregnated reinforcement elements, in which an uncured or partially cured form of the matrix material at least partially surrounds at least a portion of the reinforcement elements. In some examples, the matrix material may be introduced around the reinforcement elements (142) after defining the geometry of nosecone 30 (144). For example, resin transfer molding may be used to introduce matrix material or a precursor of matrix material into a mold that contains reinforcement elements. In some examples, e.g., examples in which nosecone 30 includes both pre-impregnated woven as well as filament wound, 3-D woven pre-form, or overbraided reinforcement elements, matrix material may be introduced both before and after defining the geometry of nosecone 30 (144).

Once the matrix material is introduced (84), the matrix material may be cured (146). The matrix material may be cured by introducing energy into the matrix material, e.g., via convention, conduction, infrared radiation, ultraviolet radiation, or the like. Curing the matrix material may result in nosecone 30.

In some examples, the technique in FIG. 10 may optionally include applying erosion resistant coating 78 (FIG. 4) to nosecone 30 (88). In some examples, erosion resistant coating 78 may be applied prior to curing of the matrix material (146), such that the erosion resistant coating 78 is cured into nosecone 30. In other examples, erosion resistant coating 78 may be applied after curing of the matrix material (146), which may allow erosion resistant coating 78 to be removed form nosecone 30, e.g., in response to damage to erosion resistant coating 78. This may allow erosion resistant coating 78 to be replaced without necessitating an entire new nosecone 30

In this way, the technique of FIG. 10 may be used to form a composite nosecone including a matrix material, relatively higher-modulus reinforcement elements, and relatively tougher polymer-based reinforcement elements. By including relatively higher-modulus reinforcement elements, the composite nosecones may be relatively lightweight, yet strong to resist forces acting upon the composite nosecone. By including relatively tougher polymer-based reinforcement elements in addition to relatively higher-modulus reinforcement elements, the composite nosecone may exhibit increased toughness (e.g., reduced brittleness), which may increase resistance to fracturing when struck by a foreign object, such as birds, hailstones, or the like.

Various examples have been described. These and other examples are within the scope of the following claims.

What is claimed is:

1. A composite nosecone comprising:
a body substantially symmetrical around a central axis, the body including a side wall defining a diameter of the body that increases from a forward side of the body to an aft side of the body,
wherein the body comprises a composite material including a plurality of relatively higher-modulus reinforcement elements, a plurality of relatively tougher polymer-based reinforcement elements, and a matrix material substantially encapsulating the plurality of relatively higher-modulus reinforcement elements and the plurality of relatively tougher polymer-based reinforcement elements,
wherein the plurality of relatively higher-modulus reinforcement elements are different from the plurality of relatively tougher polymer-based reinforcement elements,
wherein the side wall comprises:
a forward annular region comprising a first layer, wherein the forward annular region has a first ratio of relatively higher-modulus reinforcement elements to relatively tougher polymer-based reinforcement elements; and
an aft annular region comprising the first layer and a second layer, wherein the aft annular region has a second ratio of relatively higher-modulus reinforcement elements to relatively tougher polymer-based reinforcement elements, and wherein the first ratio is greater than the second ratio.

2. The composite nosecone of claim 1, wherein the plurality of relatively higher-modulus reinforcement elements have a tensile modulus of greater than 60 GPa and an elongation at break of less than 6.0%.

3. The composite nosecone of claim 1, wherein the plurality of relatively higher-modulus reinforcement elements have a tensile modulus of greater than 180 GPa and an elongation at break of less than 6.0%.

4. The composite nosecone of claim 2, wherein the plurality of relatively higher-modulus reinforcement elements comprise at least one of an aromatic polyamide, a carbon fiber, E-glass, or S-glass.

5. The composite nosecone of claim 1, wherein the plurality of relatively tougher polymer-based reinforcement elements have an elongation at break of greater than 6.0%.

6. The composite nosecone of claim 5, wherein the plurality of relatively tougher polymer-based reinforcement elements comprise at least one of a polyamide, a polyester, a polyester terephthalate, a polypropylene, a polyethylene, or a spider silk.

7. The composite nosecone of claim 1, further comprising at least one attachment area integrally formed with the body, wherein the at least one attachment area comprises the first layer and the second layer, and wherein the at least one attachment area is shaped and positioned to attach the composite nosecone to a fan assembly.

8. The composite nosecone of claim 1, wherein the plurality of relatively higher-modulus reinforcement elements comprise relatively higher-modulus filaments, wherein the plurality of relatively tougher polymer-based reinforcement elements comprise relatively tougher polymer-based filaments, and wherein the relatively higher-modulus filaments and relatively tougher polymer-based filaments are together in a hybrid or commingled braid, a hybrid or commingled weave, or a hybrid or commingled winding.

9. The composite nosecone of claim 1, wherein the matrix material comprises a thermoset polymer.

10. The composite nosecone of claim 1, wherein the aft annular region is a second annular region, wherein side wall further comprises:
  a third annular region aft the second annular region, wherein the third annular region comprises the first layer, the second layer, and a third layer, and wherein the third annular region has a third ratio of relatively higher-modulus reinforcement elements to relatively tougher polymer-based reinforcement elements, wherein the second ratio is greater than the third ratio; and
  a fourth annular region aft the third annular region, wherein the fourth annular region comprise the first layer, the second layer, the third layer, and a fourth layer, and wherein the fourth annular region has a fourth ratio of relatively higher-modulus reinforcement elements to relatively tougher polymer-based reinforcement elements, wherein the third ratio is greater than the fourth ratio.

11. A method of constructing a composite nosecone, the method comprising:
  defining a nosecone shape with a matrix material, a plurality of relatively higher-modulus reinforcement elements, and a plurality of relatively tougher polymer-based reinforcement elements, wherein the plurality of relatively higher-modulus reinforcement elements are different from the plurality of relatively tougher polymer-based reinforcement elements, wherein the composite nosecone comprises a body substantially symmetrical around a central axis, the body including a side wall defining a diameter of the body that increases from a forward side of the body to an aft side of the body, and wherein the side wall comprises:
    a forward annular region comprising a first layer, wherein the forward annular region has a first ratio of relatively higher-modulus reinforcement elements to relatively tougher polymer-based reinforcement elements; and
    an aft annular region comprising the first layer and a second layer, wherein the aft annular region has a second ratio of relatively higher-modulus reinforcement elements to relatively tougher polymer-based reinforcement elements, and wherein the first ratio is greater than the second ratio; and
  curing a matrix material substantially encapsulating the plurality of relatively higher-modulus reinforcement elements and the plurality of relatively tougher polymer-based reinforcement elements to form the composite nosecone.

12. The method of claim 11, wherein the plurality of relatively higher-modulus reinforcement elements have a tensile modulus of greater than 60 GPa and an elongation at break of less than 6.0%.

13. The method of claim 12, wherein the plurality of relatively higher-modulus reinforcement elements comprise at least one of an aromatic polyamide, a carbon fiber, E-glass, or S-glass.

14. The method of claim 11, wherein the plurality of relatively higher-modulus reinforcement elements have a tensile modulus of greater than 180 GPa and an elongation at break of less than 6.0%.

15. The method of claim 11, wherein the plurality of relatively tougher polymer-based reinforcement elements have an elongation at break of greater than 6.0%.

16. The method of claim 15, wherein the plurality of relatively tougher polymer-based reinforcement elements comprise at least one of a polyamide, a polyester, a polyester terephthalate, a polypropylene, a polyethylene, or a spider silk.

17. The method of claim 11, wherein the composite nosecone further comprises at least one attachment area integrally formed with the body, wherein the at least one attachment area comprises the first layer and the second layer, and wherein the at least one attachment area is shaped and positioned to attach the composite nosecone to a fan assembly.

18. The method of claim 11, wherein the plurality of relatively higher-modulus reinforcement elements comprise relatively higher-modulus filaments, wherein the plurality of relatively tougher polymer-based reinforcement elements comprise relatively tougher polymer-based filaments, and wherein the relatively higher-modulus filaments and relatively tougher polymer-based filaments are together in a hybrid or commingled braid, a hybrid or commingled weave, or a hybrid or commingled winding.

19. The method of claim 11, wherein the defining the composite nosecone comprises:
  pre-impregnating the plurality of relatively higher-modulus reinforcement elements and the plurality of relatively tougher polymer-based reinforcement elements with the matrix material; and
  at least one of filament winding the pre-impregnated plurality of relatively higher-modulus reinforcement elements and the pre-impregnated plurality of relatively tougher polymer-based reinforcement elements onto a mandrel or layering the pre-impregnated plurality of relatively higher-modulus reinforcement elements and the pre-impregnated plurality of relatively tougher polymer-based reinforcement elements on a mold.

20. A composite nosecone comprising:
a body substantially symmetrical around a central axis, the body including a side wall defining a diameter of the body that increases from a forward side of the body to an aft side of the body,
wherein the body comprises a composite material including a plurality of relatively higher-modulus reinforcement elements, a plurality of relatively tougher polymer-based reinforcement elements, and a matrix material substantially encapsulating the plurality of relatively higher-modulus reinforcement elements and the plurality of relatively tougher polymer-based reinforcement elements,
wherein the plurality of relatively higher-modulus reinforcement elements are different from the plurality of relatively tougher polymer-based reinforcement elements,
wherein the side wall comprises a plurality of annular regions arranged from the forward side of the body to the aft side of the body,
wherein each respective annular region comprises a plurality of layers having a respective ratio of relatively higher-modulus reinforcement elements to relatively tougher polymer-based reinforcement elements, and
wherein the respective ratio of each forward annular region is greater than the respective ratio of an adjacent aft annular region.

* * * * *